(12) United States Patent
Gillan et al.

(10) Patent No.: US 9,193,332 B2
(45) Date of Patent: Nov. 24, 2015

(54) WHEEL COVER FOR WHEELED VEHICLES

(71) Applicant: BRAVO SPORTS, Santa Fe Springs, CA (US)

(72) Inventors: Kevin Gillan, Santa Fe Springs, CA (US); Mark Groenhuyzen, Huntington Beach, CA (US); Joseph C. Klingl, Los Angeles, CA (US); Jack B. Lovley, II, Lake Forest, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 14/033,108

(22) Filed: Sep. 20, 2013

(65) Prior Publication Data

US 2014/0084560 A1  Mar. 27, 2014

Related U.S. Application Data

(60) Provisional application No. 61/704,388, filed on Sep. 21, 2012.

(51) Int. Cl.
*B60R 25/09* (2013.01)
*A63C 17/01* (2006.01)
(Continued)

(52) U.S. Cl.
CPC .............. *B60R 25/09* (2013.01); *A63C 17/002* (2013.01); *A63C 17/01* (2013.01); *A63C 17/22* (2013.01);
(Continued)

(58) Field of Classification Search
CPC .......... B60B 7/02; B60B 7/16; B60B 7/0006; B60B 7/08; B60B 7/068; B60B 2900/3315; B65D 85/06; B60C 19/003; B60C 19/125; B60C 27/06; B60R 25/09; B60R 25/093; A63C 17/014; A63C 17/002; A63C 17/226; A63C 17/26; A63C 17/262; B60T 3/00
USPC .............. 118/505; 301/37.101–37.43; 188/5; 206/303, 315.1, 335
See application file for complete search history.

(56) References Cited

U.S. PATENT DOCUMENTS

| 2,241,686 | A | * | 5/1941 | Ware ........................ 301/108.3 |
| 4,315,569 | A |   | 2/1982 | Jaeschke |
| 5,214,944 | A | * | 6/1993 | Wolthoff ........................ 70/226 |
| 5,333,477 | A | * | 8/1994 | Davis ............................. 70/226 |
| D469,348  | S |   | 1/2003 | Demus et al. |

(Continued)

FOREIGN PATENT DOCUMENTS

| EP | 1 982 881 A1 | 10/2008 |
| EP | 2 127 965 A1 | 12/2009 |

(Continued)

OTHER PUBLICATIONS

International Search Report and Written Opinion; Application No. PCT/US2013/060976; Dec. 20, 2013.

*Primary Examiner* — Paul N Dickson
*Assistant Examiner* — Timothy Wilhelm
(74) *Attorney, Agent, or Firm* — Knobbe Martens Olson & Bear, LLP

(57) ABSTRACT

A wheel cover for a wheeled vehicle which can be placed onto an associated wheel and secured using the same securing mechanism used to secure wheels to the wheeled vehicle. The securing member can be, for example, a nut typically used to attach wheels to the wheeled vehicle. The wheel cover can have a circumferential wall portion to cover a rolling surface of the associated wheel and a sidewall portion to contact a side of the associate wheel. The circumferential wall portion can have multiple features, such as protrusions, to reduce or inhibit rotation of the associated wheel when the wheel cover is attached thereto.

26 Claims, 10 Drawing Sheets

(51) Int. Cl.
  *A63C 17/00* (2006.01)
  *A63C 17/22* (2006.01)
  B60T 3/00 (2006.01)
  *A63C 17/26* (2006.01)
  *B60B 7/02* (2006.01)
  *B60B 7/16* (2006.01)

(52) U.S. Cl.
  CPC .............. *A63C 17/226* (2013.01); *B60T 3/00* (2013.01); *A63C 17/26* (2013.01); *B60B 7/02* (2013.01); *B60B 7/16* (2013.01); *B60B 2200/47* (2013.01); *B60B 2900/3315* (2013.01); *Y10T 29/49826* (2015.01)

(56) References Cited

U.S. PATENT DOCUMENTS

| | | | |
|---|---|---|---|
| D470,409 S | 2/2003 | Clarke et al. | |
| 6,997,022 B1* | 2/2006 | DeMange | 70/19 |
| 7,278,520 B2* | 10/2007 | Kim | 188/4 R |
| 7,819,245 B1 | 10/2010 | Singh et al. | |
| 7,886,901 B1 | 2/2011 | Singh et al. | |
| 7,937,975 B2* | 5/2011 | Kolton et al. | 70/57.1 |
| 2012/0234446 A1 | 9/2012 | Brown et al. | |

FOREIGN PATENT DOCUMENTS

| | | |
|---|---|---|
| FR | 2 555 908 A1 | 6/1985 |
| WO | WO 2004/048168 A1 | 6/2004 |

\* cited by examiner

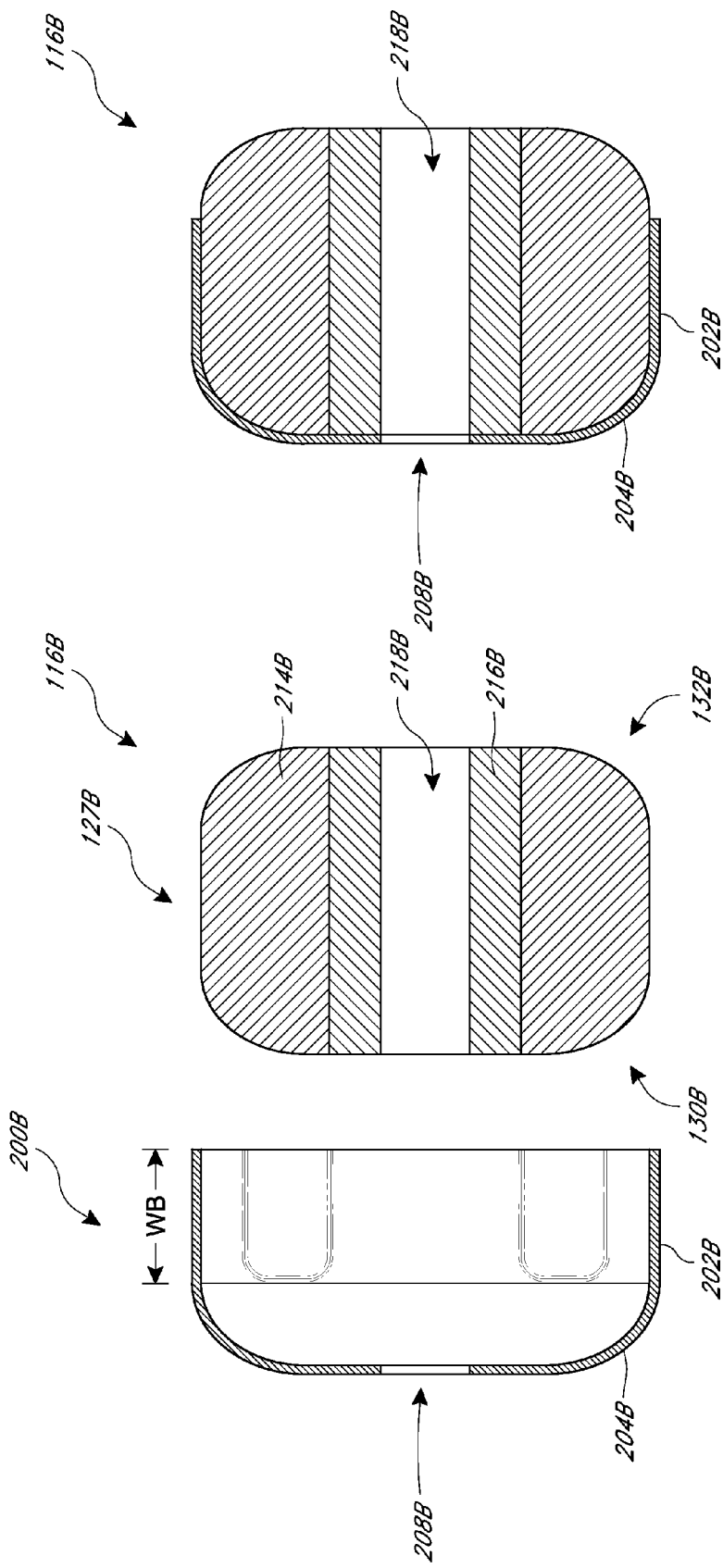

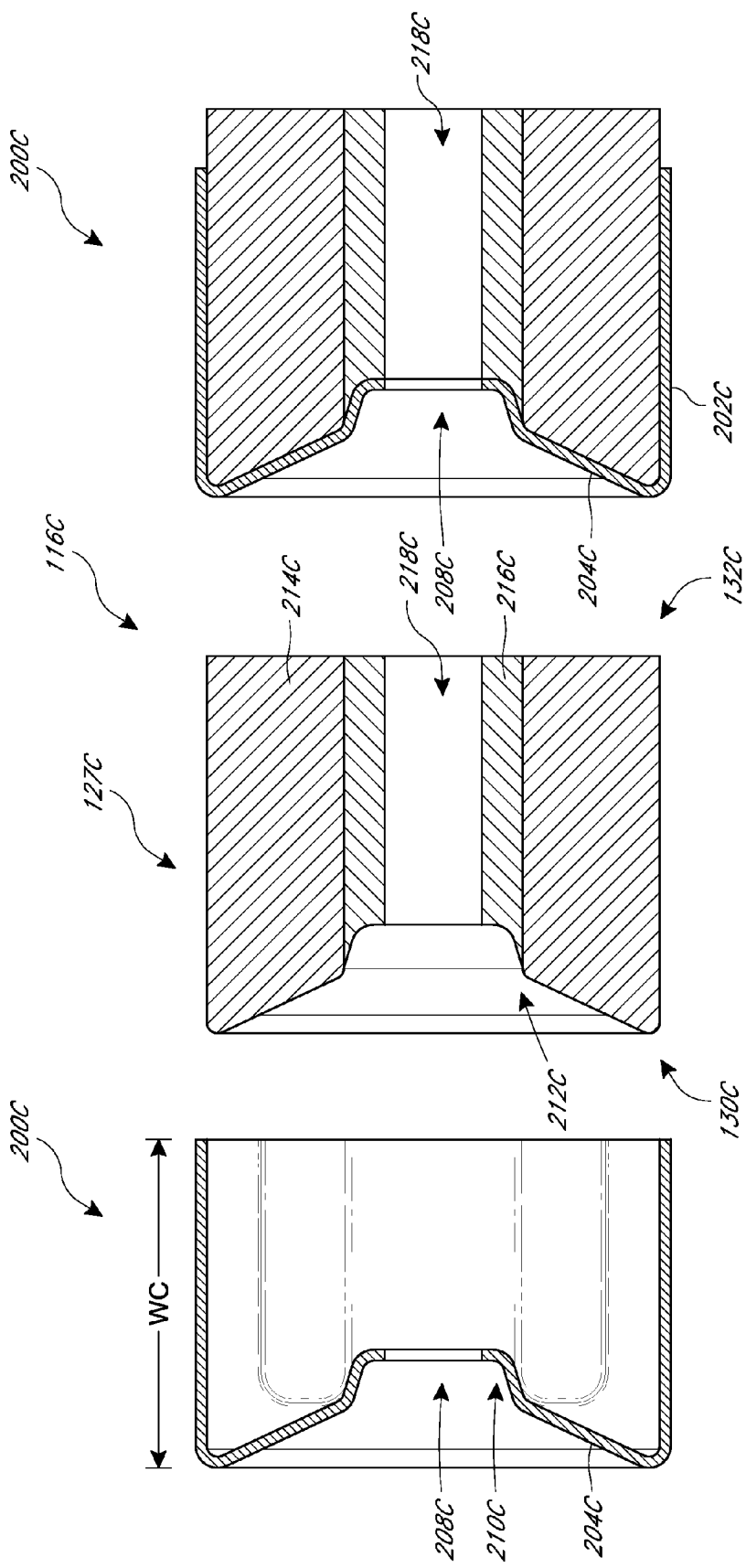

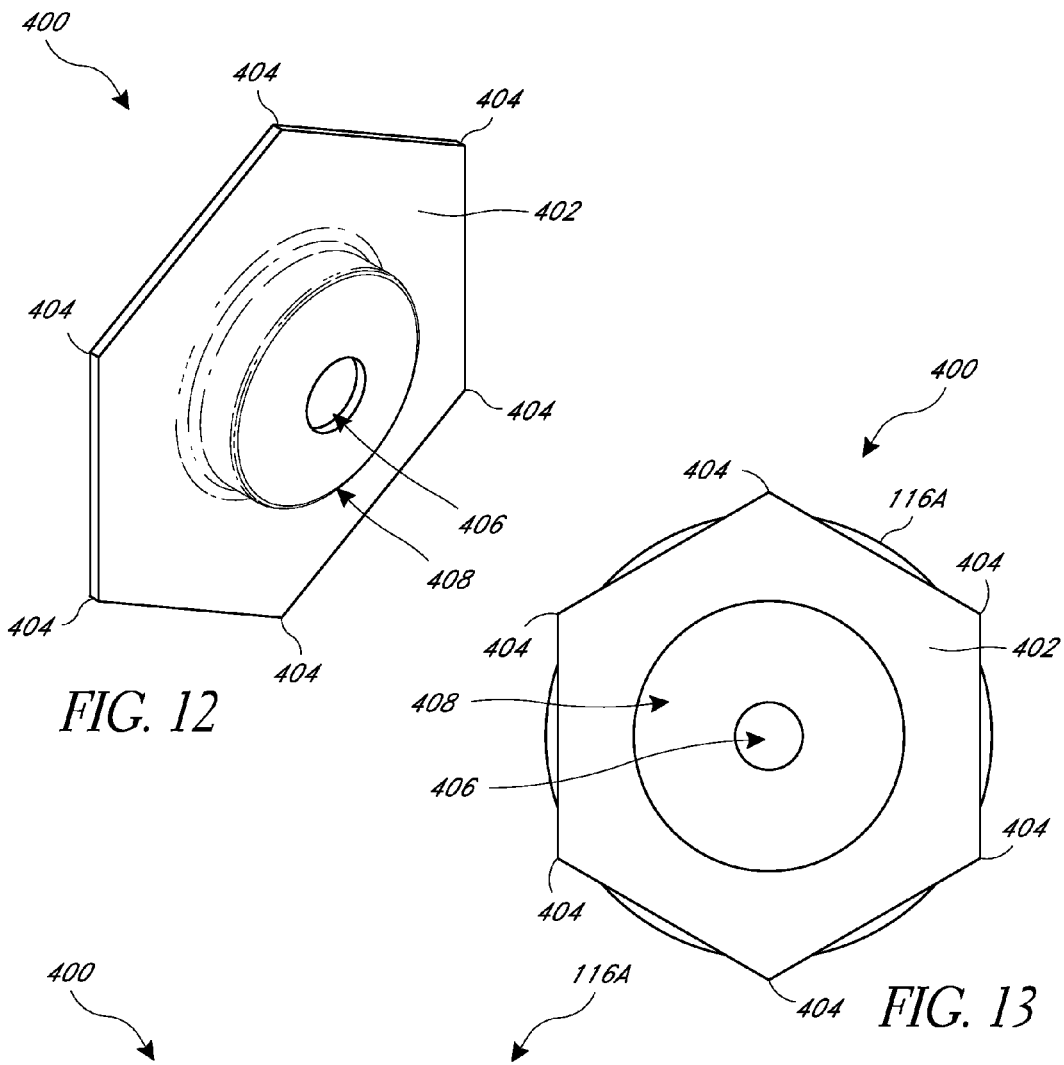
FIG. 12
FIG. 13
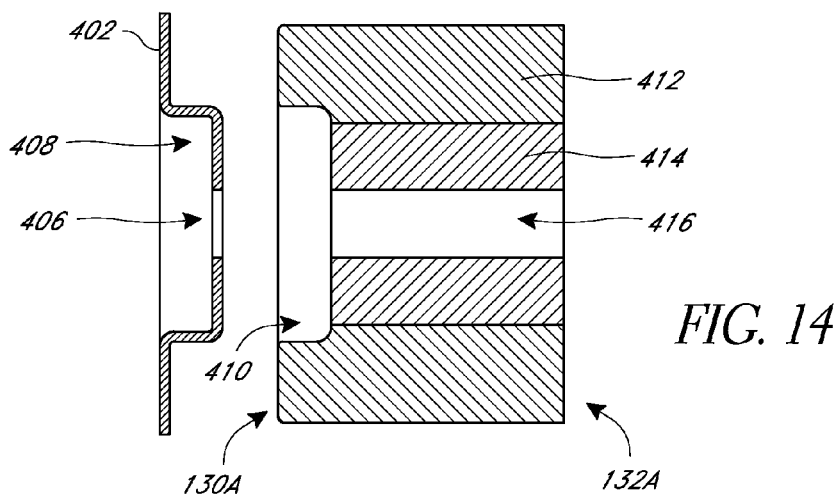
FIG. 14

WHEEL COVER FOR WHEELED VEHICLES

INCORPORATION BY REFERENCE TO ANY PRIORITY APPLICATIONS

The present application claims priority to U.S. Provisional Application No. 61/704,388 filed Sep. 21, 2012, entitled WHEEL COVER FOR SKATEBOARD OR THE LIKE, the entire contents of which are hereby expressly incorporated by reference.

BACKGROUND OF THE INVENTION

1. Field of the Invention

In general, the present invention relates to packaging, inventory control or accessories for a wheeled vehicle, such as a skateboard, scooter, or the like.

2. Description of the Related Art

Wheeled vehicles, such as a skateboard, are often displayed in stores so that a customer can view the vehicles designs and features prior to making a purchasing decision. In order to more closely view the designs and features, it is often beneficial to allow the customer to inspect the wheeled vehicle by hand. However, by allowing the customers access to the vehicle, sometimes without supervision, there is a risk of customers attempting to ride the wheeled vehicle regardless of whether or not such riding is permitted. Accordingly, there is a need to develop devices, systems and methods which reduce the likelihood of, or even prevent, customers from attempting to ride the wheeled vehicle in the store while still allowing customers access to the vehicles.

SUMMARY OF THE INVENTION

In one embodiment, a wheel cover for a wheel of a wheeled vehicle is disclosed having a circumferential wall portion designed to be placed over at least a portion of a rolling surface of the wheel, a sidewall portion extending from the circumferential wall portion designed to be placed adjacent a side of the wheel, an opening on the sidewall portion sized and positioned to allow an elongate member of a connection assembly to pass therethrough, and one or more protrusions located along the circumferential wall portion to inhibit rotation of the wheel on which the wheel cover is attached, wherein the wheel cover is designed to be secured to the wheel using a securing member on the elongate member.

In some embodiments, the circumferential wall portion can cover some portion of the rolling surface of the wheel. In some embodiments, the circumferential wall portion can cover about 75% of the width of the rolling surface of the wheel. In some embodiments, the circumferential wall portion can cover about 100% of the rolling surface of the wheel. In some embodiments, the sidewall portion can be designed to be placed on an exterior or outboard side of the wheel such that it is secured between the securing member and the wheel. In some embodiments, the sidewall portion can be designed to be placed on an interior or inboard side of the wheel such that it is secured between the wheel and the connection assembly. In some embodiments, the securing member can be a nut. In some embodiments, the same securing member used to secure the wheel cover to the wheel can be the same securing member used to secure wheels, which do not have wheel covers, to the connection assembly. In some embodiments, the wheel cover can have four protrusions. In some embodiments, the protrusions of the wheel cover can be generally cylindrical in shape.

In one embodiment, a method for reducing the rolling capabilities of a wheel of a wheeled vehicle is disclosed having the steps of providing a wheel cover comprising a sidewall portion, a circumferential wall portion, and one or more protrusions along the circumferential wall portion, placing the wheel cover over the wheel of the wheeled vehicle such that at least a portion of the circumferential wall portion engages at least a portion of a rolling surface of the wheel and securing the wheel cover to the wheel using a securing member.

In some embodiments, the method can also include placing the wheel onto an elongate member of a connection assembly of the wheeled vehicle. In some embodiments, the step of placing the wheel cover over the wheel can occur before the step of placing the wheel onto an elongate member. In some embodiments, the step of placing the wheel cover over the wheel can occur after the step of placing the wheel onto an elongate member. In some embodiments, the step of placing the wheel cover over the wheel of the wheeled vehicle can include placing the wheel cover on an outboard or exterior side of the wheel. In some embodiments, the step of placing the wheel cover over the wheel of the wheeled vehicle can include placing the wheel cover on an inboard or interior side of the wheel.

In one embodiment, a wheel system is disclosed which includes a wheel and a wheel cover which has a circumferential wall portion designed to cover at least a portion of a rolling surface of the wheel, a sidewall portion extending from the circumferential wall portion designed to be placed adjacent to a side of the wheel, an opening on the sidewall portion sized and positioned to allow an elongate member of a connection assembly to pass therethrough, and one or more protrusions positioned along the circumferential wall portion, and wherein the wheel cover can be secured to the wheel using a securing member on the elongate member.

In some embodiments, at least a portion of the wheel cover is deformed onto the wheel to enhance the fit. In some embodiments, at least a portion of the wheel cover can be removably attached to the wheel. In some embodiments, the circumferential wall portion can be designed to be placed over 75% of the rolling surface of the wheel. In some embodiments, the circumferential wall portion can be designed to be placed over 100% of the rolling surface of the wheel.

BRIEF DESCRIPTION OF THE DRAWINGS

These and other features, aspects and advantages of the wheel cover are described with reference to drawings of preferred embodiments, which are intended to illustrate the features, aspects and advantages and not to limit the disclosure.

FIG. 7A is a side view of the wheel cover of FIG. 5 and an embodiment of a wheel in an unattached state.

FIG. 7B is a side view of the wheel cover of FIG. 5 and the wheel of FIG. 7A in an attached state.

FIG. 10A is a side view of the wheel cover of FIG. 8 and a second embodiment of a wheel in an unattached state.

FIG. 10B is a side view of the wheel cover of FIG. 8 and the wheel of FIG. 10A in an attached state.

FIG. 12 is a perspective view of an inward-facing surface of a fourth embodiment of a wheel cover.

FIG. 13 is a front view of the wheel cover of FIG. 12.

FIG. 14 is a side view of the wheel cover of FIG. 12 and the wheel of FIG. 4 in an unattached state.

DETAILED DESCRIPTION OF THE PREFERRED EMBODIMENTS

As will be described, the present application relates to a wheel cover devices and system and methods for producing and assembling wheel covers. It should be appreciated that while the figures and description herein often refers to wheel covers for a wheeled vehicle, often in reference to four-wheeled vehicles such as skateboards, in modified embodiments the wheel covers can be applied to other types of wheeled devices with any other number of wheels such as two-wheeled scooters and three-wheeled tricycles.

Wheeled Vehicle System

Figure 1A:
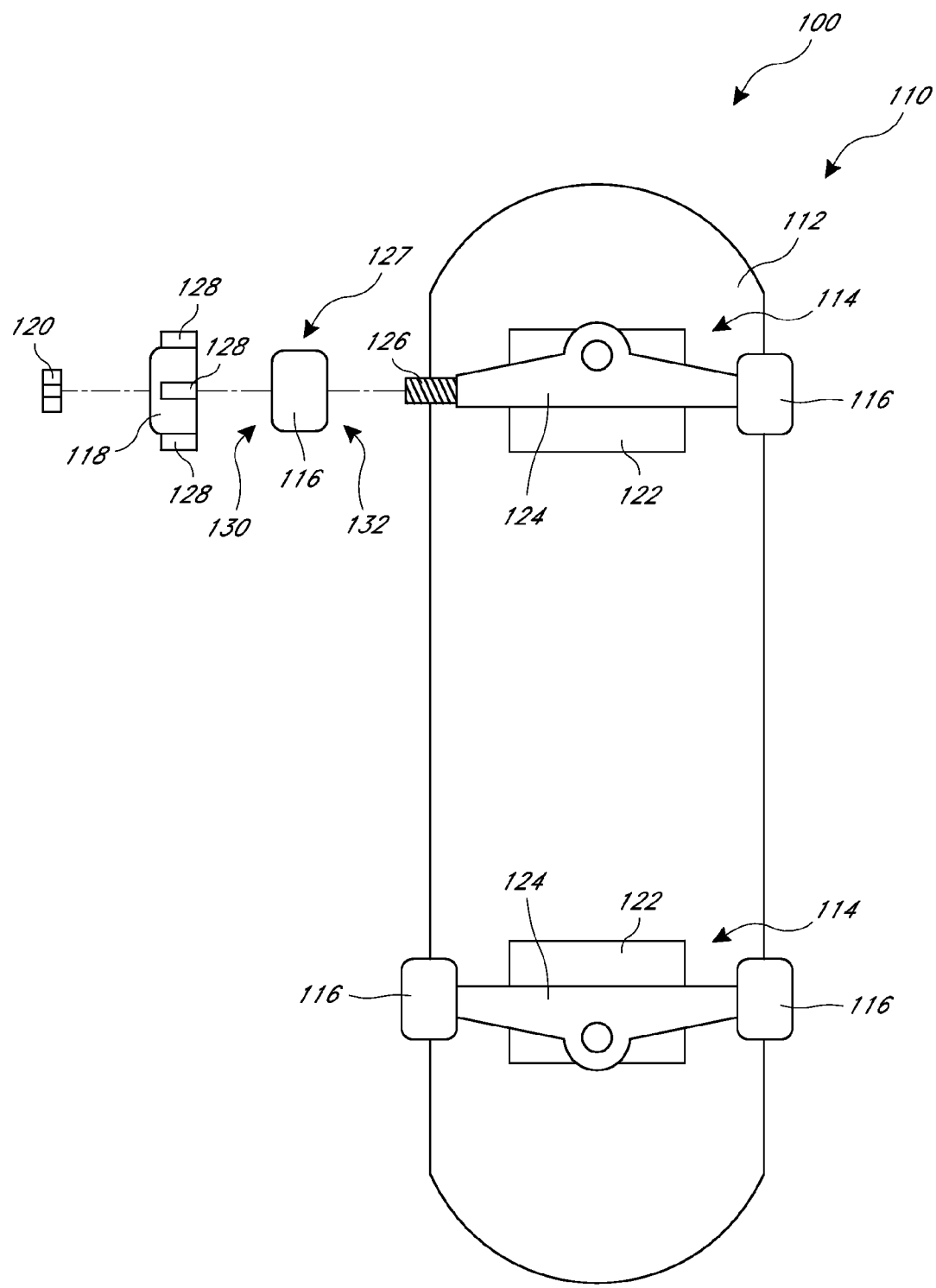
FIG. 1A is a bottom view of an embodiment of a wheeled vehicle system having a wheeled vehicle and wheel cover, the wheel cover being attached on an exterior side.
Figure 1B:
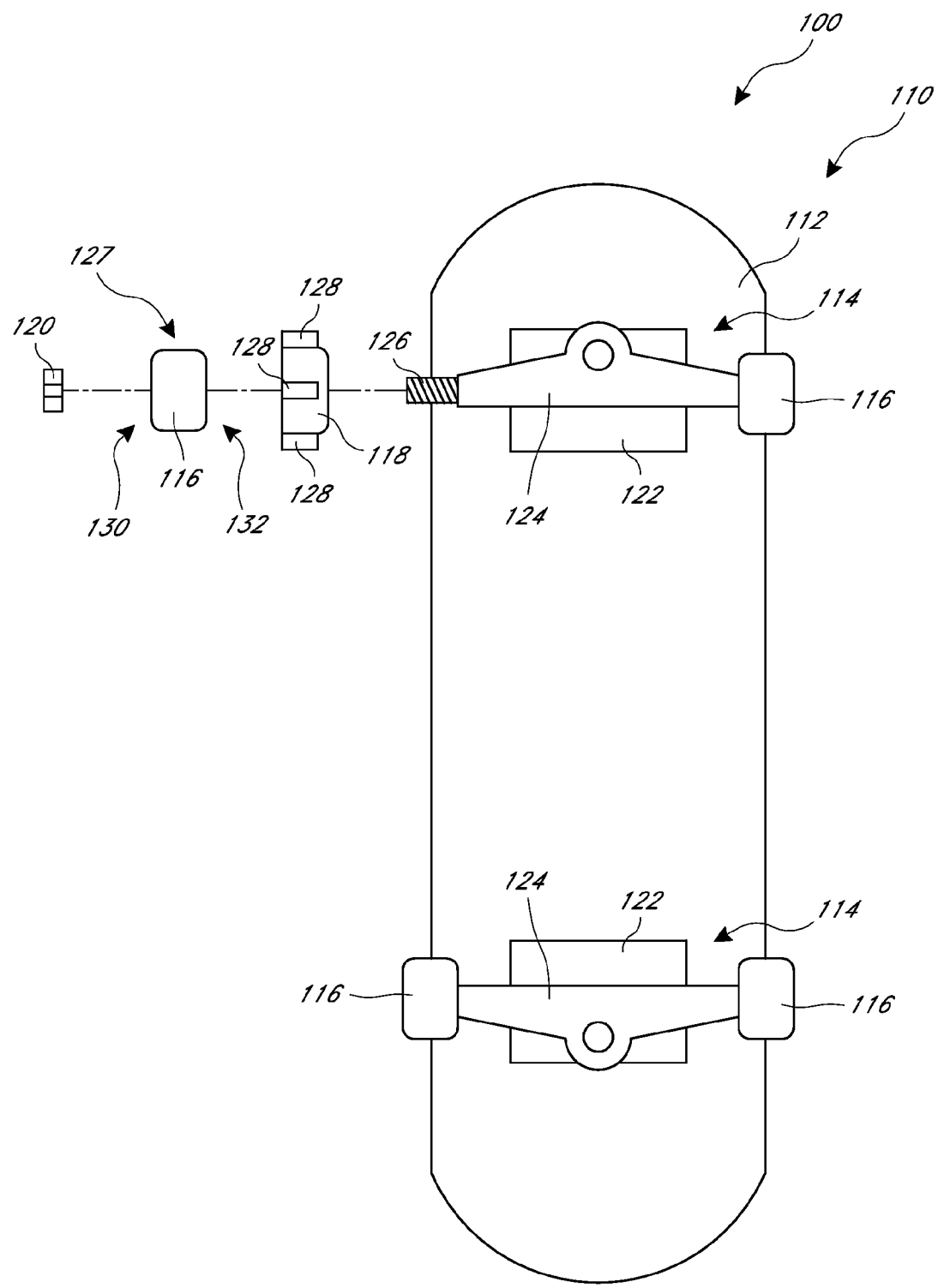
FIG. 1B is a bottom view of an embodiment of a wheeled vehicle system having a wheeled vehicle and wheel cover, the wheel cover being attached on an interior side.

With reference to FIGS. 1A and 1B, an embodiment of a wheeled vehicle system 100 is shown which includes a wheeled vehicle 110 having a vehicle platform 112 with two connection assemblies (e.g., wheel trucks) 114 for attaching wheels 116 to the vehicle platform 112. The wheeled vehicle system 100 can include multiple wheels 116, one or more wheel covers 118, and a securing member or fastener 120 to secure the wheels 116 and/or wheel covers 118 to the connection assemblies 114. As will be discussed in more detail below, in some embodiments, the securing member 120 used to secure the wheel 116 with wheel cover 118 can be the same as the securing member used to secure wheels 116 without wheel covers. In some embodiments, the securing member 120 used to secure the wheel 116 with wheel cover 118 can be the different from the securing member used to secure wheels 116 without wheel covers. While only one wheel cover 118 is illustrated in this embodiment, it should be understood that any number of wheel covers 118 can be used. For example, four wheel covers 118 can be used to cover all four wheels 116 of the wheeled vehicle 110.

As illustrated in FIGS. 1A and 1B, the connection assembly 114 can include a frame 122 for attaching the connection assembly 114 to the vehicle platform 112. In some embodiments, the frame 122 can be separate from the vehicle platform 112 and can be fastened to the vehicle platform 112 through the use of fasteners such as screws, rivets, nails and the like. This can facilitate replacement and removal of a connection assembly 114. For example, this type of structure can sometimes be found in commercial embodiments of four-wheeled vehicles such as skateboards and the like. In some embodiments, the frame 122 can be integral with, and in some instances form part of, the vehicle platform 112. This type of structure can sometimes be found in commercial embodiments of two-wheeled scooters.

In some embodiments, the connection assembly 114 can also include an axle member 124 on which the wheels 116 can be rotatably attached. The axle member 124 can be attached to the frame 122 in order to attach the wheels to the vehicle platform 112. In some embodiments, the axle member 124 can include one or more elongate members 126 upon which the wheels 116 can be rotatably attached. In the illustrated embodiment, the elongate members 126 extend in opposite directions; however, axle members 124 having different configurations can also be used. In some embodiments, the elongate members 126 can be threaded along an exterior surface such that a securing member 120, such as a threaded nut, can be used to secure the wheel 116 to the elongate member 126. This thread-and-nut design can advantageously allow an axle member 124 to accommodate multiple widths of wheels 116. Of course, other types of securing mechanisms and fasteners can be used such as screws, with an appropriately designed axle 124. While the frame 122 and axle 124 have been described as separate pieces, it should be appreciated that the frame 122 and axle 124 can form an integral unit. Furthermore, while the connection assembly 114 has been described as including both a frame 122 and axle 124, it should be appreciated that the connection assembly can 114 include any other components to attach the wheels 116 to the vehicle platform 112.

As will be discussed in greater detail with respect to the various embodiments of the wheel cover 118 below, the wheel cover 118 can be designed to partially or entirely surround at least a surface of the wheel that rolls along a surface during normal use of the wheeled vehicle 110 (i.e., the "rolling surface" 127). For example, as shown in the illustrated embodiment, the wheel cover 118 can include one or more protrusions 128 oriented along the rolling surface 127 of the wheel 116 to which it is attached such that rotation of the wheel 116 can be inhibited. Of course, as will be described in other embodiments below, the wheel cover 118 can also be designed such that it does not cover the rolling surface 127. In some embodiments, wheel cover 118 can have plate-like structure. Furthermore, in some embodiments, the wheel cover 118 can also be designed to exert sufficient friction on a surface of the wheel 116 to reduce the ability for the wheel 116 to roll.

If the individual attempts to ride the wheeled vehicle 110 with the wheel cover 118 in place, the wheeled vehicle 110 would be restricted to traveling, at most, short distances before coming to a stop. As should be apparent, this inability to travel longer distances before coming to a stop can advantageously deter an individual from attempting to ride the wheeled vehicle 110 with the wheel cover 118 in place. Accordingly, the individual would first need to remove the wheel cover 118 before using the wheeled vehicle 110. However, because the wheel cover 118 can be secured to the wheel 116 using a securing member 120, the individual would advantageously face significant difficulty in removing the wheel cover 118 without proper tools. This is particularly true in embodiments of the wheel cover 118 which snugly fit around the surface of the wheel 116 such that an individual would find it difficult to obtain a sufficient hold on the wheel cover 118 to potentially tear the wheel cover 118.

With continued reference to FIG. 1A, as shown in the illustrated embodiment, the wheel cover 118 can be placed between the wheel 116 and the securing member 120 in an "outboard" connection configuration such that the wheel cover 118 is placed on an exterior or outboard side 130 of the wheel 116. The securing member 120 can be, for example, a hexagonal or octagonal threaded nut designed to positively engage with the exterior threading of the elongate member 126 of the axle member 124. In some embodiments, a washer or similar device can be placed between the securing member 120 and the wheel cover 118 to distribute load across a surface of the wheel cover 118. With reference to FIG. 1B, the wheel cover 118 can also be attached to an interior or inboard side 132 of the wheel 116 in an "inboard" connection configuration such that it is placed on a side opposite that of the securing member 120. In such embodiments, the wheel cover 118 would be placed between the wheel and a portion of the connection assembly 114.

Use of the securing member 120 can significantly increase the difficulty of removing the wheel cover 118 without the corresponding tools. Indeed, because it is highly unlikely that an individual would carry the corresponding tools to remove the securing member 120 and facilitate removal of the wheel cover 118, an individual would be tasked with destroying the wheel cover 118 in order to ride the wheeled vehicle 110. Because destruction of the wheel cover 118 can be made quite difficult via the design of the wheel cover 118, as described below in more detail, an individual would likely be highly deterred from removing the device, which takes both time and effort, simply to ride the wheeled vehicle 110.

Advantageously, as described above with respect to some embodiments, the securing member 120 can be similar, or identical, to securing members (not shown) used to connect the other wheels 116 to axle member 124. This can beneficially reduce the costs of using the wheel cover 118 because the same securing members 120 can be used for any wheel 116 regardless of whether or not a wheel cover 118 is being used for that wheel. As such, a manufacturer need not stock multiple types of securing members 120 if they intend to use wheel covers 118.

Furthermore, a manufacturer need not design additional tooling in order to incorporate the wheel covers 118 into a production line. Rather, the wheel cover 118 can be advantageously incorporated into an existing production line with little to no modification. Indeed, the only additional step would be the addition of the wheel cover at some point before securing the wheel 116 to the axle member 124. For example, the wheel cover 118 can first be placed on an outboard side 130 of the wheel 116 prior to the wheel 116 being mounted or placed on and secured to the axle member 124. As a second example, the wheel cover 118 can be placed onto the wheel 116 after the wheel 116 has been mounted or placed onto the axle member 124. As should be apparent, in "inboard" connection configurations, the wheel cover 118 can first be placed on an inboard side of the wheel 116 prior to the wheel 116 being mounted or placed onto and secured to the axle member 124. As a second example, the wheel cover 118 can be placed onto the axle member 124 prior to the wheel 116 being mounted and secured to the axle member 124.

Of course, use of the term "outboard" and "inboard" in this disclosure is solely used for facilitating the explanation of certain connection configurations. It should be appreciated that, for other types of wheeled devices, such as two-wheeled scooters, there may not be a distinct "inboard" and "outboard" side. For such devices, it is possible that the wheel 116 is placed between two portions of a frame 122 with an axle member 124 secured on outer portions of the frame 122. It should be appreciated that the wheel cover 118, and any other wheel cover 118 described herein, can be used in such a configuration with the wheel cover 118 being secured onto the wheel 116 between the frame 122 and the wheel 116.

As an additional advantage of using a securing member 120, after removing the securing member 120 to remove the wheel cover 118 from a wheel, the same securing member 120 can be used to secure that wheel 116 back onto the elongate member 126. Accordingly, removal of the wheel cover 118 can be performed using the same tool used to remove any other wheel 116 from the elongate member 126. As such tools would often be carried in stores carrying such wheeled vehicles 110, since such tools would likely be used for repair or replacement of wheels 116, the stores would likely already have the requisite tools to make use of the wheel covers 118 described herein.

In addition to or as an alternative to a normal securing member 120, in some embodiments, securing members 120 can be different from those used to secure the other wheels 116 to the connection assembly. For example, the securing members 120 can be keyed to a specialized tool such that it would be difficult for a consumer, prior to purchasing the wheeled vehicle 110, to acquire the tool required to remove the securing members 120 for facilitating removal of the wheel cover 118. In some embodiments, the specialized tool for removing the keyed securing member 120 can be included in the packaging such that the consumer can remove the securing member only after purchasing the wheeled vehicle 110. In some embodiments, these specialized securing members 120 can be replaced, by store personnel, upon purchase with a non-specialized securing member so that the customer need not have the specialized tool for replacing the wheel 116 in the future. This can advantageously further reduce the likelihood of a consumer attempting to ride the wheeled vehicle 110 as it is even less likely that a consumer would purchase such a specialized tool simply to ride such vehicles in a store.

Cup Wheel Covers

The following wheel cover embodiments disclosed herein can be used similar to that of the wheel cover 118 described with respect to FIGS. 1A and 1B above. Additionally, any of the structural features of any wheel cover embodiment can be combined in any way. As should be made apparent by disclosure contained herein, the multiple embodiments of wheel covers disclosed herein are intended to illustrate how the wheel cover can be designed to fit particular types of wheels. Because there can be multiple types of wheels, it should be understood that the disclosure contained herein should incorporate other configurations intended to fit the numerous other types of wheels used in the wheeled vehicle industry.

Figure 3:
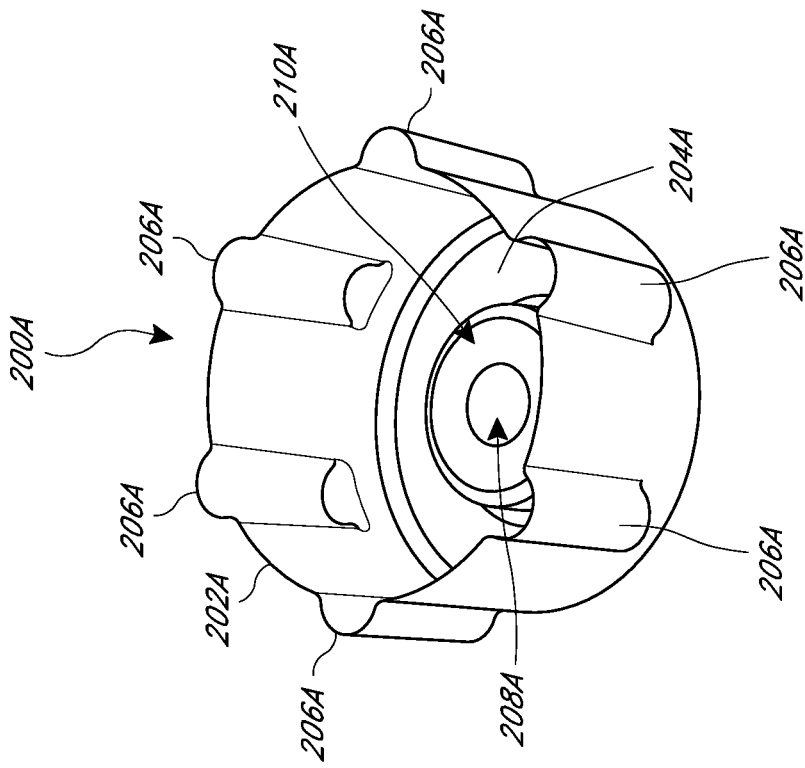
FIG. 3 is a perspective view of an inward-facing surface of the wheel cover of FIG. 2.
Figure 2:
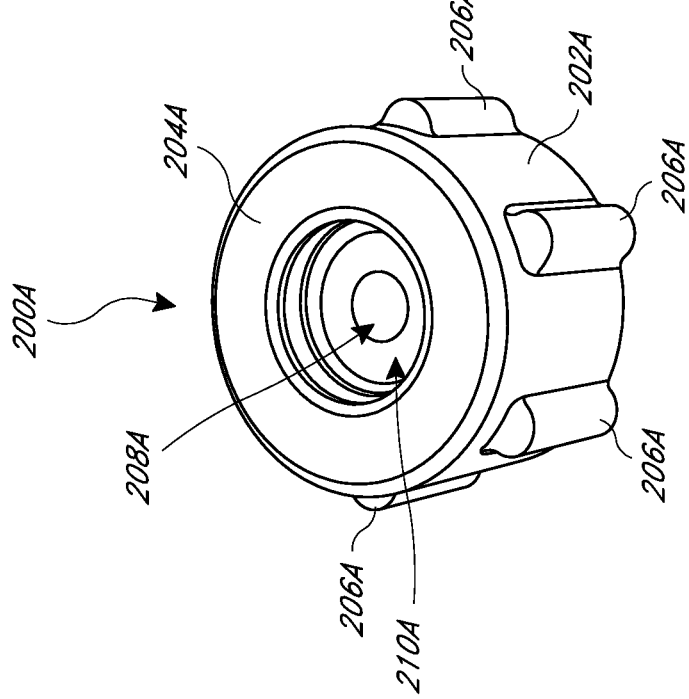
FIG. 2 is a perspective view of an outward-facing surface of an embodiment of the wheel cover.
Figure 4:
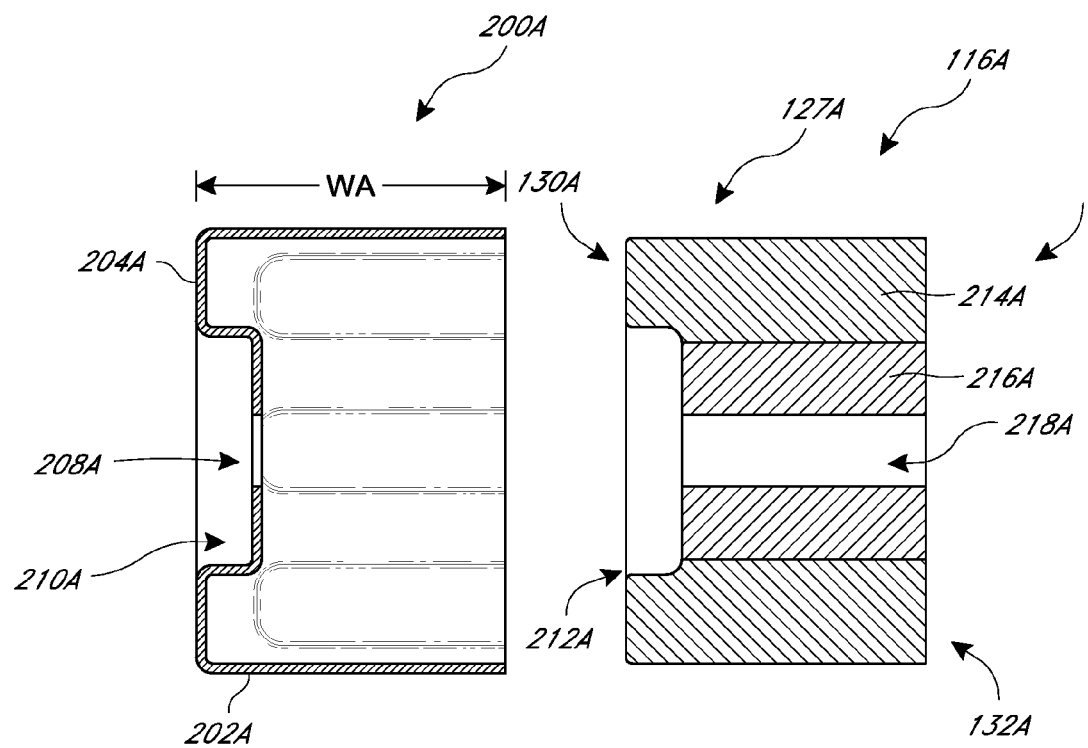
FIG. 4 is a side cross-sectional view of the wheel cover of FIG. 2 and an embodiment of a wheel in an unattached state.
Figure 6:
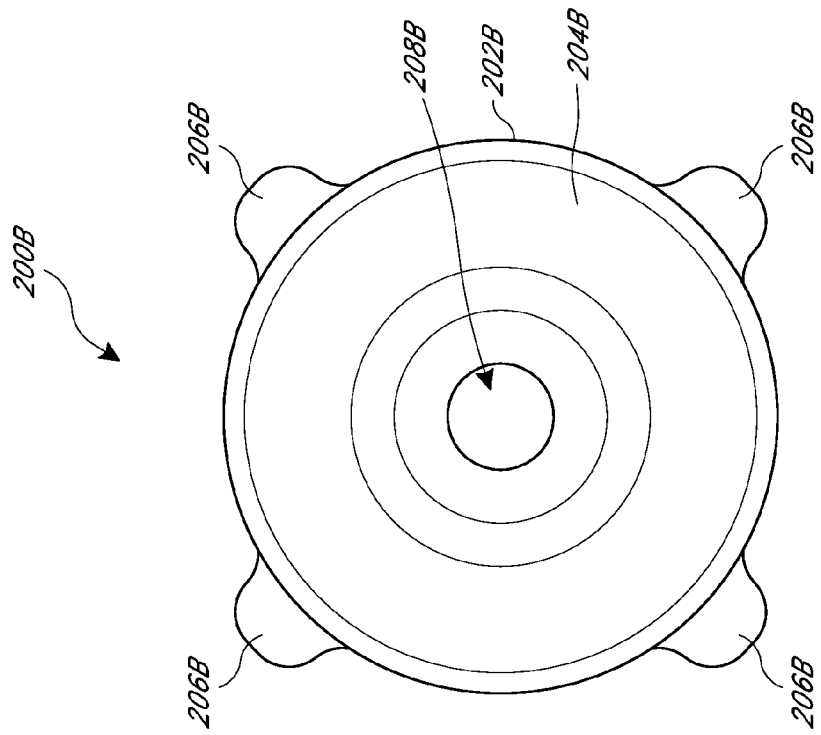
FIG. 6 is a front view of the wheel cover of FIG. 5.
Figure 5:
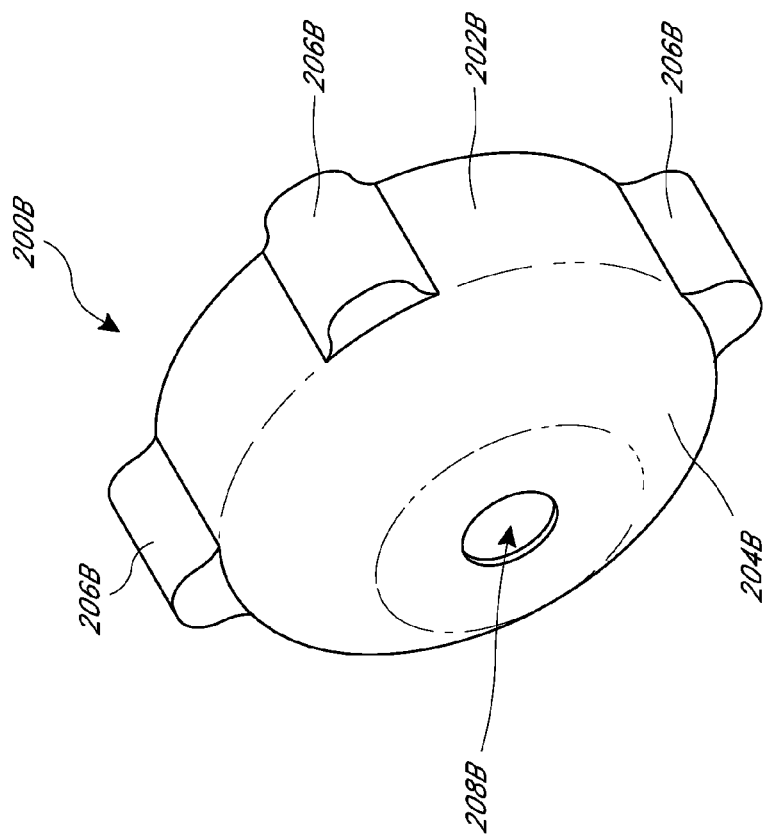
FIG. 5 is a perspective view of an outward-facing surface of a second embodiment of a wheel cover.
Figure 9:
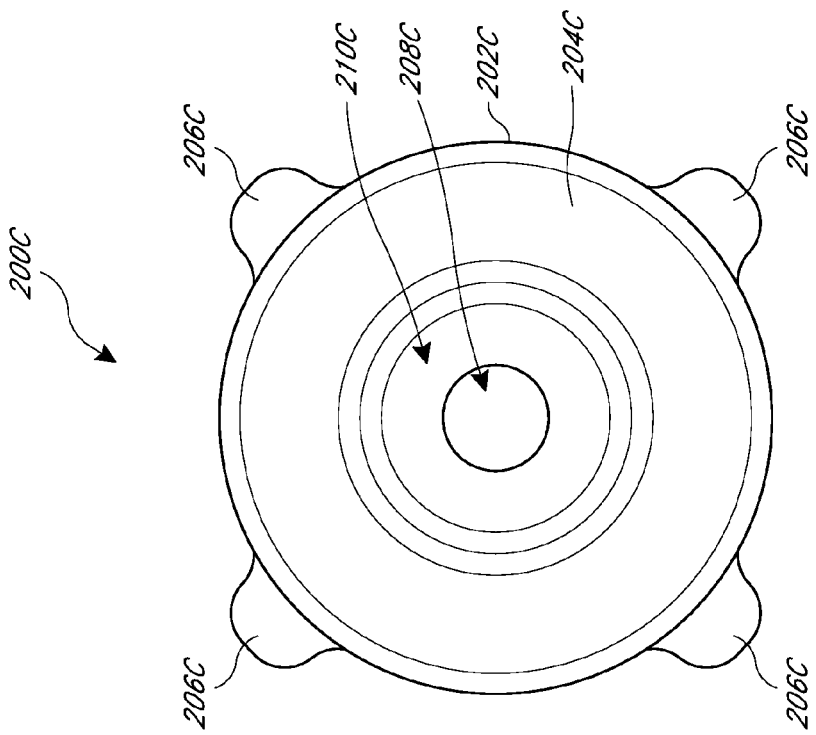
FIG. 9 is a front view of the wheel cover of FIG. 8.
Figure 8:
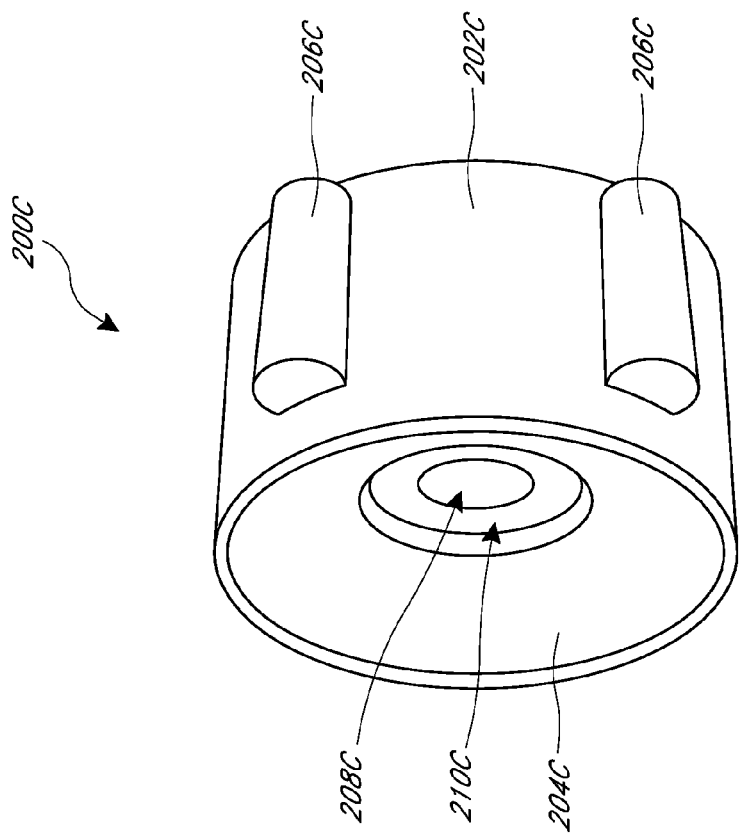
FIG. 8 is a perspective view of an outward-facing surface of a third embodiment of a wheel cover.

FIGS. 2-4 illustrate an embodiment of a wheel cover 200A designed to couple relative to a wheel 116A which can be used on a wheeled vehicle, such as wheeled vehicle 110. As shown in the illustrated embodiment, the wheel cover 200A can have a circumferential wall portion 202A and a sidewall portion 204A that extends radially inward from an edge of the circumferential wall portion 202A. The circumferential wall portion 202A can be sized and shaped to surround the rolling surface 127A of the wheel 116A. In some embodiments, the circumferential wall portion 202A and sidewall portion 204A can surround a significant portion of the wheel 116A in a relatively snug manner. The circumferential wall portion 202A can define a width WA from one edge to the opposite edge that is at least a significant portion of the width of the wheel 116A.

In some embodiments, the width WA can be approximately equal to or less than the width of the wheel 116A from the exterior side 130A to the interior side 132A. In some embodiments, the width WA of the circumferential wall portion 202A can be chosen such that the circumferential wall portion 202A covers at least some portion of the rolling surface 127A of the wheel 116A when attached to and secured to the wheel 116A. In some embodiments, the circumferential wall portion 202A can cover from approximately 10% to 100% of the rolling surface 127A of the wheel 116A, from approximately 30% to approximately 90% of the rolling surface 127A of the wheel 116A, from approximately 50% to approximately 80% of the rolling surface 127A of the wheel 116A, approximately 50% of the rolling surface 127A of the wheel 116A, approximately 75% of the rolling surface 127A of the wheel 116A, and any other percentage within these ranges. It can be advantageous for the circumferential wall portion 202A to have an edge which terminates at some portion along the rolling surface 127A of the wheel 116A such that the edge remains snug against the rolling surface 127A. By remaining snug against the rolling surface 127A, it becomes more difficult for an individual to attain a sufficient hold of the wheel cover 200A thereby making it more difficult for the individual to destroy the wheel cover 200A for instance by tearing. Furthermore, in some embodiments, the circumferential wall portion 202A can extend beyond the rolling surface 127A. In some embodiments, the circumferential wall portion 202A can be constructed of two or more separate parts and/or be molded to more closely fit the wheel to which it is attached.

The circumferential wall portion 202A can include at least one protruding surface portion or protrusion 206A, which can extend outwardly in a radial direction relative to an adjacent surface portion of the circumferential wall portion 202A, which can define the basic or underlying shape (e.g., generally cylindrical) of the circumferential wall portion 202A. The protrusion 206A can extend outwardly in a radial direction a distance sufficient to inhibit, or in some instances prevent, the wheel 116A from rolling in an effective manner along a surface during attempted normal use of a wheeled vehicle, such as wheeled vehicle 110. In some embodiments, the radial extension of the protrusion 206A can be from approximately 2 mm to approximately 15 mm, from approximately 5 mm to approximately 10 mm, at least 8 mm, and any other radial extension sufficient to inhibit or prevent the wheel 116A from rolling in an effective matter. In some embodiments, the radial dimension of the protrusion 206A can be at least approximately 5%, at least approximately 10%, between approximately 5% to 20%, between approximately 5%-10% or between approximately 10%-20% of the radial dimension (e.g., diameter) of the circumferential wall portion 206A and/or wheel 116A. Accordingly, the wheel cover 200A can inhibit or prevent wheeled vehicles, particularly those on display such as display skateboards, from being ridden by individuals at the store. In some embodiments, the wheel cover 200A can form a portion of the packaging of the wheeled vehicle and can include a suitable arrangement (e.g., hook or peg opening) to facilitate the display of the wheeled vehicle, such as providing a structure for hanging the wheeled vehicle on a hook or peg, for example.

With continued reference to FIGS. 2-4, the protrusion 206A can be an elongate rib having any suitable cross-sectional shape, such as the semi-circular cross-sectional shape of the illustrated embodiment. In some embodiments, the protrusion 206A could also have a cross-sectional shape at least partially defined by straight surfaces. Additional embodiments of protrusions, such as protrusion 206A, are described below with respect to FIGS. 11A-11E. As shown in the illustrated embodiment, the lengthwise direction of the protrusion 206A can extend in a width WA direction of the circumferential wall portion 202A and, in some embodiments, can be substantially parallel with a central axis of the circumferential wall portion 206A. This orientation can advantageously increase the ability of the wheel cover 200A to inhibit rotation of the wheel 116A. In some embodiments, the protrusions 206A can extend at least some length of the width WA of the circumferential wall portion 202A. In some embodiments, the protrusion 206A can extend from approximately 20% to approximately 100% of the width WA, from approximately 40% to approximately 80% of the width WA, from approximately 50% to 75% of the width, and any other ratio of the width WA.

As shown in the illustrated embodiment, the protrusion 206A does not extend entirely across the width of the circumferential wall portion 202A, but stops short of the edge adjacent the sidewall portion 204A. In some embodiments, the protrusion 206A extends from the sidewall portion 204A and stop short of the edge opposite the sidewall portion 204A. In some embodiments, the protrusion 206A does not extend to either edge but remains between the two edges. In some embodiments, the protrusion 206A can extend beyond one or both edges and potentially onto the sidewall portion 204A. Although the embodiment shown has open faces along the edge opposite the sidewall portion protrusions 206A, in some embodiments, some or all of the protrusions 206A can have closed faces to reduce the likelihood that an individual can obtain a sufficient hold of the wheel cover 200A and potentially forcibly tear the wheel cover 200A from the wheel 116A.

As shown in the illustrated embodiment, in some embodiments, multiple protrusions 206A are provided, which can all be similar to one another or can have different sizes, shapes and/or orientations. In the illustrated embodiment, six protrusions 206A are provided and all of the protrusions 206A are similar in size, shape and orientation. Preferably, the protrusions 206A are evenly spaced around the circumferential wall portion 202A. Preferably, the distance between the protrusions 206A is selected such that when two protrusions 206A are in contact with a surface on which riding of the wheeled vehicle is attempted, the protrusions 206A tend to inhibit or prevent rolling of the wheel 116A.

With continued reference to FIGS. 2-4, the wheel cover 200A can be secured to the wheeled vehicle 110 with any suitable arrangement. For example, as described above with respect to FIGS. 1A and 1B, the wheel cover 200A can be secured to a wheeled vehicle, such as wheeled vehicle 110, using a securing member such as securing member 120 on either an exterior side 130A or an interior side 132A of the wheel 116A. As shown in the illustrated embodiment, the sidewall portion 204A can define an opening 208A, which can be centrally located and configured to receive an end portion of an axle, such as the elongate member 126 of axle member 124 of the wheeled vehicle 110, which is outboard of the wheel 116A. A securing member, such as a nut (which can be the nut that secures the wheel 116A to the axle or an auxiliary nut or other fastener), can secure the wheel cover 200A to the wheeled vehicle. For example, as illustrated, the securing member can secure a portion of the sidewall portion 204A adjacent the opening 208A between the fastener 120 and the wheel 116A. In some embodiments, the opening 208A can have a circular shape with a diameter ranging from approximately 0.5 cm to 2 cm, from approximately 0.8 cm to approximately 1.5 cm, approximately 1 cm, and any other ranges configured to receive an end portion of an axle.

In some embodiments, the sidewall portion 204A can include additional features 210A to permit the wheel cover 200A to more snugly or closely fit the wheel 116A. For example, as shown in the illustrated embodiment, the wheel cover 200A can include a recessed feature positioned about the opening 208A which can allow the wheel cover 200A to more snugly fit the wheel 116A upon which it is attached. For example, the feature 210A can correspond to a recessed part 212A of the wheel 116A. This recessed part 212A could be formed, for example, by the wheel portion 214A and a bearing 216A. This closer fit can therefore enhance the securement of the wheel cover 200A to the wheel 116A. The opening 208A can be centered on a bore 218A of the bearing 216A.

Furthermore, in the illustrated embodiment, the wheel cover 200A can have a thin-walled construction and be designed to have a relatively compact form factor when attached to the wheel 116A. For example, in some embodiments, the thickness of the walls of the wheel cover 200A can be from approximately 0.2 mm to approximately 3 mm, from approximately 0.4 mm to approximately 2 mm, from approximately 0.6 mm to approximately 1 mm, approximately 0.8 mm, and any other thickness configured to reduce the form factor when attached to a wheel. Not only does this make it more difficult for an individual to separate the wheel cover 200A from the wheel 116A but also reduces the overall size of the wheel cover 200A. Accordingly, this can significantly reduce manufacturing costs for these wheel covers, such as wheel cover 200A, due to reduced material usage. Furthermore, the wheel cover, such as wheel cover 200A, can be advantageously used on a single wheel. Additionally, because of its smaller overall form factor and because it can be used on a single wheel, the wheel cover is not significantly intrusive when a consumer is examining a wheeled vehicle to which the wheel cover is attached.

FIGS. 5, 6, 7A and 7B illustrate another embodiment of a wheel cover 200B which can be designed to couple relative to a wheel 116B which can be used on a wheeled vehicle, such as wheeled vehicle 110. Wheel cover 200B can be similar in construction to wheel cover 200A. However, as described above, wheel cover 200B can be used on a different type of wheel 116B having a different shape from wheel 116A. As shown in the illustrated embodiment, the wheel cover 200B can have a circumferential wall portion 202B and a sidewall portion 204B that extends radially inward from an edge of the circumferential wall portion 202B. As shown in the illustrated embodiment, the sidewall portion 204B can have a convex shape configured to match the convex shape of the wheel 116B to which it is configured to attach on an exterior side 130B or an interior side 132B. The circumferential wall portion 202B can be sized and shaped to cover or surround the rolling surface 127B of the wheel 116B. In some embodiments, the circumferential wall portion 202B and sidewall portion 204B surround a significant portion of the wheel 116B in a relatively snug manner. The circumferential wall portion 202B can define a width WB from an edge opposite the sidewall portion 204B to an edge adjacent the sidewall portion 204B that is at least a portion of the width of the wheel 116B.

In some embodiments, the width WB of the circumferential wall portion 202B can be chosen such that it the circumferential wall portion 202B covers at least some portion of the rolling surface 127B of the wheel 116B when attached and secured to the wheel 116B. In some embodiments, the circumferential wall portion 202B can cover from approximately 10% to 100% of the rolling surface 127B of the wheel 116B, from approximately 30% to approximately 90% of the rolling surface 127B of the wheel 116B, from approximately 50% to approximately 80% of the rolling surface 127B of the wheel 116B, approximately 50% of the rolling surface 127B of the wheel 116B, approximately 75% of the rolling surface 127B of the wheel 116B, and any other percentage within these ranges. As discussed above with respect to wheel cover 200A, It can be advantageous for the circumferential wall portion 202B to have an edge which terminates at some portion along the rolling surface 127B of the wheel 116B such that the edge remains snug against the rolling surface 127B. Furthermore, in some embodiments, the circumferential wall portion 202B can extend beyond the rolling surface 127B. In some embodiments, the circumferential wall portion 202B can be constructed of two or more separate parts and/or be molded to more closely fit the wheel to which it is attached.

The circumferential wall portion 202B can include at least one protruding surface portion or protrusion 206B, which can extend outwardly in a radial direction relative to an adjacent surface portion of the circumferential wall portion 202B, which can define the basic or underlying shape (e.g., generally cylindrical) of the circumferential wall portion 202B. The protrusion 206B can extend outwardly in a radial direction a distance sufficient to inhibit, or in some instances prevent, the wheel 116B from rolling in an effective manner along a surface during attempted normal use of a wheeled vehicle, such as wheeled vehicle 110. In some embodiments, the radial extension of the protrusion 206B can be from approximately 2 mm to approximately 15 mm, from approximately 5 mm to approximately 10 mm, at least 8 mm, and any other radial extension sufficient to inhibit or prevent the wheel 116B from rolling in an effective matter. In some embodiments, the radial dimension of the protrusion 206B can be at least approximately 5%, at least approximately 10%, between approximately 5% to 20%, between approximately 5%-10% or between approximately 10%-20% of the radial dimension (e.g., diameter) of the circumferential wall portion 206B and/or wheel 116B. Accordingly, the wheel cover 200B can inhibit or prevent wheeled vehicles, particularly those on display such as display skateboards, from being ridden by individuals at the store. Similar to wheel cover 200A, in some embodiments, the wheel cover 200B can form a portion of the packaging of the wheeled vehicle and can include a suitable arrangement (e.g., hook or peg opening) to facilitate the display of the wheeled vehicle, such as providing a structure for hanging the wheeled vehicle on a hook or peg, for example.

With continued reference to FIGS. 5, 6, 7A, and 7B, the protrusion 206A can be an elongate rib having any suitable cross-sectional shape, such as the semi-circular cross-sectional shape of the illustrated embodiment. In some embodiments, the protrusion 206B could also have a cross-sectional shape at least partially defined by straight surfaces. Additional embodiments of protrusions, such as protrusion 206B, are described below with respect to FIGS. 11A-11E. As shown in the illustrated embodiment, the lengthwise direction of the protrusion 206B can extend in a width WB direction of the circumferential wall portion 202B and, in some embodiments, can be substantially parallel with a central axis of the circumferential wall portion 206B. This orientation can advantageously increase the ability of the wheel cover 200B to inhibit rotation of the wheel 116B. In some embodiments, the protrusions 206B can extend at least some length of the width WB of the circumferential wall portion 202B. In some embodiments, the protrusion 206B can extend from approximately 20% to approximately 100% of the width WB, from approximately 40% to approximately 80% of the width WB, from approximately 50% to 75% of the width, and any other ratio of the width WB.

In the illustrated embodiment, the protrusion 206B does not extend entirely across the width of the circumferential wall portion 202B, but stops short of the edge adjacent the sidewall portion 204B. In some embodiments, the protrusion 206B extends from the sidewall portion 204B and stops short of the edge opposite the sidewall portion 204B. In some embodiments, the protrusion 206B does not extend to either edge but remains between the two edges. In some embodiments, the protrusion 206B can extend beyond one or both edges and potentially onto the sidewall portion 204B. In some embodiments, some or all of the protrusions 206B can have closed faces to reduce the likelihood that an individual can obtain a sufficient hold of the wheel cover 200B and potentially forcibly tear the wheel cover 200B from the wheel 116B.

As shown in the illustrated embodiment, in some embodiments, multiple protrusions 206B are provided, which can all be similar to one another or can have different sizes, shapes and/or orientations. In the illustrated embodiment, four protrusions 206B are provided and all of the protrusions 206B are similar in size, shape and orientation. Preferably, the protrusions 206B are evenly spaced around the circumferential wall portion 202B. Preferably, the distance between the protrusions 206B is selected such that when two protrusions 206B are in contact with a surface on which riding of the wheeled vehicle is attempted, the protrusions 206B tend to inhibit or prevent rolling of the wheel 116B.

With continued reference to FIGS. 5, 6, 7A and 7B, the wheel cover 200B can be secured to a wheeled vehicle, such as wheeled vehicle 110, with any suitable arrangement. For example, as described above with regard to FIGS. 1A and 1B, the wheel cover 200B can be secured to the wheeled vehicle using a securing member such as securing member 120 on either an exterior side 130B or an interior side 132B of the wheel 116B. As shown in the illustrated embodiment, the sidewall portion 204B can define an opening 208B, which can be centrally located and configured to receive an end portion of an axle, such as the elongated member 126 of the wheeled vehicle 110, which is outboard of the wheel 116B. A securing member, such as a nut (which can be the nut that secures the wheel 116B to the axle or an auxiliary nut or other fastener), can secure the wheel cover 200B to the wheeled vehicle. For example, as illustrated, the securing member can secure a portion of the sidewall portion 204B adjacent the opening 208B between the securing member and the wheel 116B. In some embodiments, the opening 208B can have a circular shape with a diameter ranging from approximately 0.5 cm to 2 cm, from approximately 0.8 cm to approximately 1.5 cm, approximately 1 cm, and any other ranges configured to receive an end portion of an axle.

As described above with respect to FIGS. 2-4, in some embodiments, the sidewall portion 204B can include additional features 210B to permit the wheel cover 200B to more closely fit the wheel 116B. As shown in the illustrated embodiment, the wheel cover 200B does not include such features since the wheel 116B to which it is attached has no such corresponding features. As shown here, the wheel 116B can have a wheel portion 214A and a bearing 216A which are arranged to be flush. Of course, it is possible that a recessed feature similar to that of wheel cover 200A can be used if such a corresponding feature exists on the wheel to which the wheel cover is attached. The opening 208B can be centered on the bore 218B of the bearing 216B. Furthermore, similar to wheel cover 200A, the wheel cover 200B can have a thin-walled construction and be designed to have a relatively compact form factor when attached to the wheel 116B. For example, in some embodiments, the thickness of the walls of the wheel cover 200B can be from approximately 0.2 mm to approximately 3 mm, from approximately 0.4 mm to approximately 2 mm, from approximately 0.6 mm to approximately 1 mm, approximately 0.8 mm, and any other thickness configured to reduce the form factor when attached to a wheel.

FIGS. 8, 9, 10A and 10B illustrate another embodiment of a wheel cover 200C which can be designed to couple relative to a wheel 116C which can be used on a wheeled vehicle, such as wheeled vehicle 110. Wheel cover 200C can be similar in construction to wheel covers 200A and 200B. However, as described above, wheel cover 200C can be used on a different type of wheel 116C having a different shape from wheels 116A and 116B. As shown in the illustrated embodiment, the wheel cover 200C can have a circumferential wall portion 202C and a sidewall portion 204C that extends radially inward from an edge of the circumferential wall portion 202C. As shown in the illustrated embodiment, the sidewall portion 204C can be angled inwardly to match the inward angle of the wheel 116C to which it is configured to attach. The circumferential wall portion 202C can be sized and shaped to surround the rolling surface 127C of the wheel 116C. In some embodiments, the circumferential wall portion 202C and sidewall portion 204C surround a significant portion of the wheel 116C in a relatively snug manner. The circumferential wall portion 202C can define a width WC from an edge opposite the sidewall portion 204C to an edge adjacent the sidewall portion 204C that is at least a portion of the width of the wheel 116C.

In some embodiments, the width WC can be approximately equal to or less than the width of the wheel 116C from the exterior side 130C to the interior side 132C. In some embodiments, the width WC of the circumferential wall portion 202C can be chosen such that it the circumferential wall portion 202C covers at least some portion of the rolling surface 127C of the wheel 116C when attached and secured to the wheel 116C. In some embodiments, the circumferential wall portion 202C can cover from approximately 10% to 100% of the rolling surface 127C of the wheel 116C, from approximately 30% to approximately 90% of the rolling surface 127C of the wheel 116C, from approximately 50% to approximately 80% of the rolling surface 127C of the wheel 116C, approximately 50% of the rolling surface 127C of the wheel 116C, approximately 75% of the rolling surface 127C of the wheel 116C, approximately 100% of the rolling surface 127C, and any other percentage within these ranges. For example, in some embodiments, the edge of the circumferential wall portion 202C opposite the sidewall portion 204C extends across the rolling surface 127C such that approximately 1.5 cm remains exposed. As discussed above with respect to wheel covers 200A and 200B, it can be advantageous for the circumferential wall portion 202C to have an edge which terminates at some portion along the rolling surface 127C of the wheel 116C such that the edge remains snug against the rolling surface 127C. Furthermore, in some embodiments, the circumferential wall portion 202C can extend beyond the rolling surface 127C. In some embodiments, the circumferential wall portion 202C can be constructed of two or more separate parts and/or be molded to more closely fit the wheel to which it is attached.

The circumferential wall portion 202C can include at least one protruding surface portion or protrusion 206C, which can extend outwardly in a radial direction relative to an adjacent surface portion of the circumferential wall portion 202C, which can define the basic or underlying shape (e.g., generally cylindrical) of the circumferential wall portion 202B. The protrusion 206C can extend outwardly in a radial direction a distance sufficient to inhibit, or in some instances prevent, the wheel 116C from rolling in an effective manner along a surface during attempted normal use of a wheeled vehicle, such as wheeled vehicle 110. In some embodiments, the radial extension of the protrusion 206C can be from approximately 2 mm to approximately 15 mm, from approximately 5 mm to approximately 10 mm, at least 8 mm, and any other radial extension sufficient to inhibit or prevent the wheel 116C from rolling in an effective matter. In some embodiments, the radial dimension of the protrusion 206C can be at least approximately 5%, at least approximately 10%, between approximately 5% to 20%, between approximately 5%-10% or between approximately 10%-20% of the radial dimension (e.g., diameter) of the circumferential wall portion 206C and/or wheel 116C. Accordingly, the wheel cover 200C can inhibit or prevent wheeled vehicles, particularly those on display such as display skateboards, from being ridden by individuals at the store. Similar to wheel covers 200A and 200B, in some embodiments, the wheel cover 200C can form a portion of the packaging of the wheeled vehicle and can include a suitable arrangement (e.g., hook or peg opening) to facilitate the display of the wheeled vehicle, such as providing a structure for hanging the wheeled vehicle on a hook or peg, for example.

With continued reference to FIGS. 8, 9, 10A and 10B, the protrusion 206C can be an elongate rib having any suitable cross-sectional shape, such as the semi-circular cross-sectional shape of the illustrated embodiment. In some embodiments, the protrusion 206C could also have a cross-sectional shape at least partially defined by straight surfaces. Additional embodiments of protrusions, such as protrusion 206C, are described below with respect to FIGS. 11A-11E. As shown in the illustrated embodiment, the lengthwise direction of the protrusion 206C can extend in a width WC direction of the circumferential wall portion 202C and, in some embodiments, can be substantially parallel with a central axis of the circumferential wall portion 206C. This orientation can advantageously increase the ability of the wheel cover 200C to inhibit rotation of the wheel 116C. In some embodiments, the protrusions 206C can extend at least some length of the width WC of the circumferential wall portion 202C. In some embodiments, the protrusion 206C can extend from approximately 20% to approximately 100% of the width WC, from approximately 40% to approximately 80% of the width WC, from approximately 50% to 75% of the width, and any other ratio of the width WC.

In the illustrated embodiment, the protrusion 206C does not extend entirely across the width of the circumferential wall portion 202B, but stops short of the edge adjacent the sidewall portion 204C. In some embodiments, the protrusion 206C extends from the sidewall portion 204C and stops short of the edge opposite the sidewall portion 204C. In some embodiments, the protrusion 206C does not extend to either edge but remains between the two edges. In some embodiments, the protrusion 206C can extend beyond one or both edges and potentially onto the sidewall portion 204C. In some embodiments, some or all of the protrusions 206C can have closed faces to reduce the likelihood that an individual can obtain a sufficient hold of the wheel cover 200C and potentially forcibly tear the wheel cover 200C from the wheel 116C.

As shown in the illustrated embodiment, in some embodiments, multiple protrusions 206C are provided, which can all be similar to one another or can have different sizes, shapes and/or orientations. In the illustrated embodiment, four protrusions 206C are provided and all of the protrusions 206C are similar in size, shape and orientation. Preferably, the protrusions 206C are evenly spaced around the circumferential wall portion 202C. Preferably, the distance between the protrusions 206C is selected such that when two protrusions 206C are in contact with a surface on which riding of the wheeled vehicle is attempted, the protrusions 206C tend to inhibit or prevent rolling of the wheel 116C.

With continued reference to FIGS. 8, 9, 10A and 10B, the wheel cover 200C can be secured to the wheeled vehicle, such as wheeled vehicle 110, with any suitable arrangement. For example, as described above with regard to FIGS. 1A and 1B, the wheel cover 200C can be secured to the wheeled vehicle using a securing member such as securing member 120 on either an exterior side 130C or an interior side 132C of the wheel 116C. As shown in the illustrated embodiment, the sidewall portion 204C can define an opening 208C, which can be centrally located and configured to receive an end portion of an axle, such as the elongated member 126 of axle member 124 of the wheeled vehicle 110, which is outboard of the wheel 116C. A securing member, such as a nut (which can be the nut that secures the wheel 116C to the axle or an auxiliary nut or other fastener), can secure the wheel cover 200C to the wheeled vehicle. For example, as illustrated, the securing member can secure a portion of the sidewall portion 204C adjacent the opening 208C between the securing member and the wheel 116C. In some embodiments, the opening 208C can have a circular shape with a diameter ranging from approximately 0.5 cm to 2 cm, from approximately 0.8 cm to approximately 1.5 cm, approximately 1 cm, and any other ranges configured to receive an end portion of an axle.

As described above with respect to FIGS. 2-7, in some embodiments, the sidewall portion 204C can include additional features 210C to permit the wheel cover 200C to more closely fit the wheel 116C. For example, as shown in the illustrated embodiment, the wheel cover 200C can include a recessed feature positioned about the opening 208C which can allow the wheel cover 200C to more closely fit the wheel 116C upon which it is attached. For example, the feature 210C can correspond to a recessed part 212C of the wheel 116C. This recessed part 212C could be formed, for example, by the wheel portion 214C and a bearing 216C. This closer fit can therefore enhance the securement of the wheel cover 200C to the wheel 116C. The opening 208C can be centered on the bore 218C of the bearing 216C. Furthermore, similar to the wheel covers 200A and 200B, the wheel cover 200C can have a thin-walled construction and be designed to have a relatively compact form factor when attached to the wheel 116C. For example, in some embodiments, the thickness of the walls of the wheel cover 200C can be from approximately 0.2 mm to approximately 3 mm, from approximately 0.4 mm to approximately 2 mm, from approximately 0.6 mm to approximately 1 mm, approximately 0.8 mm, and any other thickness configured to reduce the form factor when attached to a wheel.

Figure 11A:
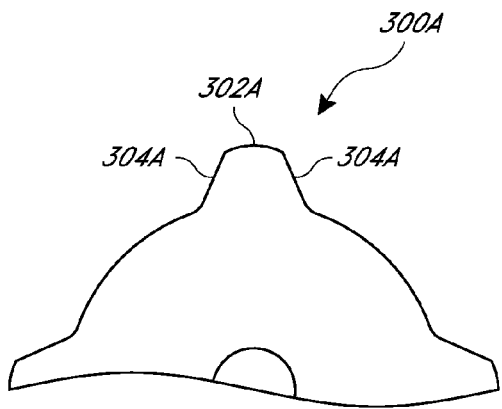
FIG. 11A is a front view of an embodiment of a protrusion of a wheel cover.

With reference to FIGS. 11A-E, multiple embodiments of protrusions 300A-E are shown having different cross-sectional shapes. As discussed above with respect to the various embodiments of wheel covers 118 and 200A-C, the protrusions 300A-E are designed to inhibit the rotation wheels to which the wheel covers are attached. With reference to FIG. 11A, in some embodiments, the protrusion 300A can have a convex top surface 302A with two side surfaces 304A. In some embodiments, the side surfaces can be curved in shape or be straight surfaces. The convex top surface 302A can potentially reduce the likelihood of the protrusion 300A from collapsing.

Figure 11B:
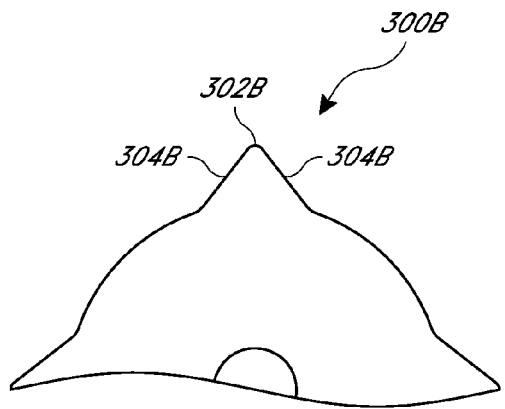
FIG. 11B is a front view of a second embodiment of a protrusion of a wheel cover.
Figure 11C:
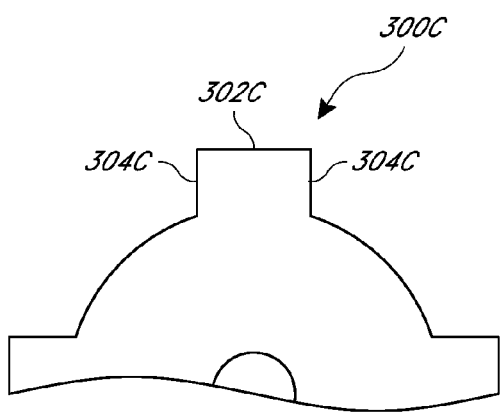
FIG. 11C is a front view of a third embodiment of a protrusion of a wheel cover.

The angle of the side surfaces 304A can be configured to increase the ability of the protrusions 300A to inhibit rotation of the wheel having a wheel cover with the protrusion 300A. For example, as shown in FIG. 11B, in some embodiments, the protrusion 302B can have a top surface 302B with a reduced width and side surfaces 304A which are more angled towards each other such. As another example, as shown in FIG. 11C, in some embodiments, the protrusion 300C can have a flat top surface 302C which is increased in width and side surfaces 304C which are angled away from each other and roughly parallel.

Figure 11D:
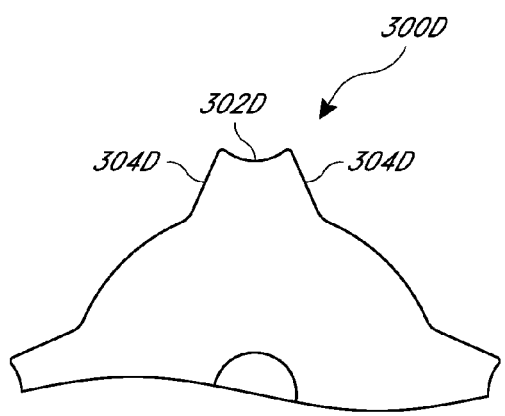
FIG. 11D is a front view of a fourth embodiment of a protrusion of a wheel cover.
Figure 11E:
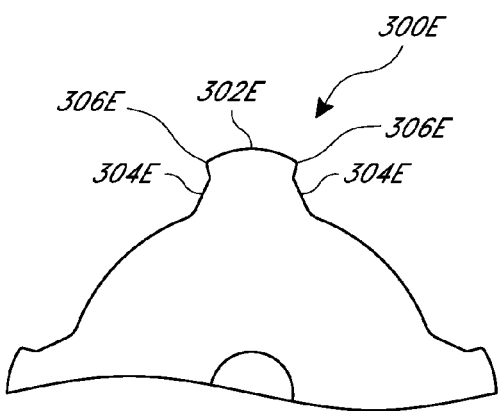
FIG. 11E is a front view of a fifth embodiment of a protrusion of a wheel cover.

In some embodiments, such as is illustrated in FIG. 11D, the protrusion 300D can have a top surface 302D which is concave and side surfaces 304D angled towards each other. The concave top surface 304D can more strongly hinder rotation of the device along a surface. With reference to FIG. 11E, the protrusion 300E can have a convex top surface 302E with two inwardly angled side surfaces 304E. Additionally, the side surfaces 304E can include additional ribbed features 306E projecting in a rolling direction.

Plate Wheel Covers

The following wheel cover embodiments disclosed herein can be used similar to that of the wheel cover 118 described with respect to FIGS. 1A and 1B above. As described with respect to FIGS. 1A and 1B, some wheel cover embodiments can have a plate-like structure.

FIGS. 12-14 illustrate an embodiment of a wheel cover 400 designed to couple relative to a wheel 116A which can be used on a wheeled vehicle, such as wheeled vehicle 110. The illustrated embodiment of a wheel cover 400 shares certain similar features with the embodiment of a wheel cover 200A described with respect to FIGS. 2-4 above. For purposes of brevity, these features will be noted. A more detailed explanation of these features can be found in the description of wheel covers, such as wheel cover 200A, above.

Wheel cover 400 can include a sidewall portion 402 which extends in a radial direction. In some embodiments, the sidewall portion 402 extends radially outward such that at least some portion of the sidewall portion 402 extends beyond the radial dimension of the wheel 116A. For example, as shown in FIG. 13, the sidewall portion 402 can have a non-round or non-circular (e.g., hexagonal) shape with protrusions (e.g., multiple corner edges) 404 extending radially outward beyond the radial dimension of the wheel 116A. Such corner edges 404, or any other protuberances, can serve a function similar to those of the protruding surface portion or protrusions discussed herein. Accordingly, when attached to a wheel 116A, parts of the sidewall portion 402 can extend outwardly in a radial direction a distance sufficient to inhibit, or in some instances prevent, the wheel 116A from rolling in an effective manner along a surface during attempted normal use of a wheeled vehicle, such as wheeled vehicle 110. As should be apparent, other shapes can also be used such as triangles, squares, pentagons other polygons, ovals, circles, and the like or any of the other shapes disclosed herein. In other configurations, the outer shape of the sidewall portion 402 can be eccentric relative to the opening 406 to similarly inhibit or prevent rotation of the associated wheel 116A.

Similar to the wheel covers as herein described with respect to FIGS. 1-10, the wheel cover 400 can be secured to the wheeled vehicle, such as wheeled vehicle 110 with any suitable arrangement. For example, as described above with respect to FIGS. 1A and 1B, the wheel cover 400 can be secured to a wheeled vehicle, such as wheeled vehicle 110, using a securing member such as securing member 120 on either an exterior side 130A or an interior side 132A of the wheel 116A. As shown in the illustrated embodiment, the sidewall portion 402 can define an opening 406, which can be centrally located and configured to receive an end portion of an axle, such as the elongated member 126 of axle member 124 of the wheeled vehicle 110, which is outboard of the wheel 116A. A securing member, such as a nut (which can be the nut that secures the wheel 116A to the axle or an auxiliary nut or other fastener), can secure the wheel cover 400 to the wheeled vehicle. For example, as illustrated, the securing member can secure a portion of the sidewall portion 402 adjacent the opening 406 between the securing member and the wheel 116A. In some embodiments, the opening 406 can have a circular shape with a diameter ranging from approximately 0.5 cm to 2 cm, from approximately 0.8 cm to approximately 1.5 cm, approximately 1 cm, and any other ranges configured to receive an end portion of an axle.

As described above with respect to FIGS. 2-10, in some embodiments, the sidewall portion 402 can include additional features 408 to permit the wheel cover 400 to more closely fit the wheel 116A. For example, as shown in the illustrated embodiment, the wheel cover 400 can include a recessed feature positioned about the opening 406 which can allow the wheel cover 400 to more closely fit the wheel 116A upon which it is attached. For example, the feature 408 can correspond to a recessed part 410 of the wheel 116A. This recessed part 410 could be formed, for example, by the wheel portion 412 and a bearing 414. This closer fit can therefore enhance the securement of the wheel cover 400 to the wheel 116A. The opening 406 can be centered on the bore 416 of the bearing 414. As was shown with respect to wheel covers 200A-C, the sidewall portion 402 can have different types of features 408 or no feature at all depending on the type of wheel to which the wheel cover 400 is to be placed. Additionally, as shown particularly with respect to wheel covers 200B and 200C, the sidewall portion 402 can have a non-linear (e.g., wheel cover 200B) and/or angled (e.g., wheel cover 200C) shape in cross-section.

In some embodiments, the wheel cover, such as wheel covers 200A-C and 400, can also be designed to exert sufficient friction against the wheel to inhibit, or in some instances prevent, the wheel from rolling in an effective manner along a surface during attempted normal use of a wheeled vehicle, such as wheeled vehicle 110. This feature can be combined with the general shape of the wheel cover to further inhibit, or in some instances prevent, the wheel from rolling in an effective manner. For example, the sidewall portion, such as sidewall portions 204A-C and 402, can be designed such that when secured between a securing member and a wheel or between the wheel and a portion of a connection assembly, the wheel cover tends not to rotate as a result of friction between the securing member and the wheel cover or the connection assembly and the securing member. This inhibition of rotation of the wheel cover can be used to further inhibit the rotation of the wheel.

In some embodiments, this friction can be sufficient to inhibit, or in some instances prevent, the wheel from rolling in an effective manner. In some embodiments, a wheel cover, similar to wheel cover 400, can be designed in which the sidewall portion, such as sidewall portion 402, does not extend beyond the radial dimension of the wheel. Accordingly, in such an embodiment, the wheel cover does not inhibit rotation of the wheel via the shape of the wheel cover but via frictional contact between the securing member (or connection assembly), the wheel cover, and the wheel. As with the sidewall portion 402, the sidewall portion of such an embodiment can take various shapes such as triangles, squares, pentagons other polygons, ovals, circles, and the like. This embodiment of a wheel cover can advantageously further reduce the form factor of the wheel cover such that the wheel cover is more discrete when placed on a wheeled vehicle for display. Accordingly, in some embodiments, indicators can also be placed on the wheel cover which instruct the customer to remove the wheel cover prior to use. As with the wheel covers, such as wheel covers 200A-C and 400 as herein described, this embodiment of a wheel cover can be placed on either an exterior side of a wheel, such as is shown in FIG. 1A, or an interior side of a wheel, such as is shown in FIG. 1B.

While the wheel covers disclosed herein have used a securing member, such as a nut, to secure the wheel cover to the wheel, it should be appreciated that other securing methods can also be used for attaching any of the wheel covers to the wheel. For example, in some embodiments, the wheel cover can be temporarily attached to the wheel using a temporary or light adhesive. Accordingly, the wheel cover can be attached to a wheel prior to placement on a wheeled vehicle. Of course, in some embodiments, the close fit of the wheel cover with the wheel, and the tackiness of the wheel portion of a wheel, can be sufficient to temporarily hold the wheel cover in place prior to being secured to the wheeled vehicle using a securing member.

In some embodiments, the wheel cover can be manufactured from a material which can shrink or deform. For example, a material which can shrink when exposed to heat. In such embodiments, the wheel cover can be placed over a wheel and heated so that it more tightly fits around the surface of the wheel. This manufacturing process can allow the wheel cover to cover both the interior and exterior sides of a wheel. In some embodiments, the wheel cover can be constructed from multiple pieces or portions that can capture the wheel therebetween and be secured to one another using a fastener, welding, adhesives, or the like.

Moreover, in some embodiments, the edge opposite the edge adjacent to the sidewall portion can be slightly tapered radially outward to facilitate insertion of the wheel cover onto the wheel. In other embodiments, such as those illustrated above, the edge opposite the edge adjacent to the sidewall portion is not tapered remains flush such that it can remain flush against a rolling surface of the wheel.

In some embodiments, the wheel covers can be constructed of a suitable, thin-walled plastic material by any suitable process such as thermoforming, injection molding, and the like. The wheel cover can have a unitary (i.e., single-piece) construction. Of course, in other embodiments, the wheel cover can be constructed in multiple pieces from any suitable plastic or non-plastic material by any suitable process. Furthermore, in some embodiments, some portions of the wheel cover can be manufactured to be more structurally rigid than other components. For example, in some embodiments, such as wheel cover 400, the sidewall portion 402 can be manufactured using a more rigid material or the same material with a greater thickness to reduce the likelihood of the sidewall portion 402 buckling.

Although this invention has been disclosed with reference to generally circular cross-sectional geometries, as circular shapes are generally found in wheels, it should be appreciated that other shapes can be used as well. For example, the circumferential wall portions 202A-C described herein need not be limited to a purely circular design but is instead intended to cover other shapes which can be placed around the peripheral section of a wheel. For example, the circumferential wall portion of wheel covers can have other geometrical shapes such as ovals, squares, pentagons, hexagons, and the like. Accordingly, such embodiments can also have sidewall portions with non-circular shapes such as is described with respect to the wheel cover 400.

Furthermore, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof.

In particular, while the present wheel cover has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A wheel cover attachable to an associated wheel of a wheeled vehicle, the wheeled vehicle having a connection assembly to connect the associated wheel to the wheeled vehicle, the wheel cover comprising:
a sidewall portion, the sidewall portion sized to be placed adjacent to a side of the associated wheel when the wheel cover is attached to the associated wheel, the sidewall portion comprising an opening sized and positioned such that an elongate member of the connection assembly can pass therethrough when the wheel cover is attached to the associated wheel; and
one or more protrusions located on the wheel cover to inhibit rotation of the associated wheel;
wherein the opening is sized and positioned such that a securing member on the elongate member contacts the sidewall portion to secure the wheel cover to the associated wheel when the wheel cover is attached to the associated wheel; and
wherein the sidewall portion is sized to be placed on an exterior side of the wheel such that the sidewall portion is secured between the securing member and the wheel when the wheel cover is attached to the associated wheel.

2. The wheel cover of claim 1, further comprising a circumferential wall portion and wherein the circumferential wall portion is sized to cover the entire width of the rolling surface of the associated wheel when the wheel cover is attached to the associated wheel.

3. The wheel cover of claim 1, wherein the protrusions are positioned along a circumferential wall portion.

4. The wheel cover of claim 1, wherein the securing member comprises a nut configured to secure the associated wheel to the elongate member.

5. The wheel cover of claim 1, further comprising a circumferential wall portion and wherein the circumferential wall portion is sized to cover a significant width of the rolling surface of the associated wheel when the wheel cover is attached to the associated wheel.

6. The wheel cover of claim 1, wherein the protrusions comprise a generally cylindrical shape.

7. The wheel cover of claim 1, wherein the protrusions have a length equal to at least a substantial portion of the width of the circumferential wall portion.

8. The wheel cover of claim 1, further comprising an opening configured to allow a hook or peg to pass therethrough to facilitate the display of the wheeled vehicle.

9. The wheel cover of claim 1, wherein the wheel cover is of a unitary construction.

10. The wheel cover of claim 1, wherein the wheel cover does not cover the securing member such that the securing member remains accessible when the wheel cover is attached to the associated wheel.

11. A method for reducing the rolling capabilities of a wheel of a wheeled vehicle, the method comprising:
  providing a wheel cover comprising a sidewall portion comprising an opening, a circumferential wall portion extending from the sidewall portion, and at least one protrusion along the circumferential wall portion;
  placing the wheel cover over the wheel of the wheeled vehicle such that at least a portion of the circumferential wall portion engages at least a significant portion of a width of the wheel and the sidewall portion is placed on an outboard side of the wheel; and
  securing the wheel cover to the outboard side of the wheel using a securing member such that the sidewall portion is secured between the securing member and the wheel.

12. The method of claim 11, further comprising placing the wheel onto an axle of the wheeled vehicle.

13. The method of claim 11, wherein the step of placing the wheel onto an axle comprises placing the axle through the opening of the wheel cover.

14. The method of claim 11, wherein the securing member comprises a nut configured to secure the wheel to an axle of the wheeled vehicle.

15. The method of claim 11, wherein the providing of the wheel cover comprises providing a wheel cover with a unitary construction.

16. The method of claim 11, wherein the placing and securing of the wheel cover does not result in covering the securing member such that the securing member remains accessible when the wheel cover is attached to the associated wheel.

17. A vehicle comprising:
  at least one wheel; and
  a wheel cover configured to be placed over the associated wheel, the wheel cover comprising:
    a circumferential wall portion, at least a portion of the circumferential wall portion sized such that at least a portion of the circumferential wall portion covers a portion of a rolling surface of the associated wheel when assembled;
    a sidewall portion extending from the circumferential wall portion, the sidewall portion sized such that the sidewall portion engages an exterior side of the wheel when assembled, the sidewall portion comprising an opening sized and positioned to allow an elongate member of the connection member to pass therethrough; and
    one or more protrusions positioned along the circumferential wall portion configured to inhibit rotation;
  wherein the wheel cover is configured to be secured to the exterior side of the wheel using a securing member on the elongate member such that the sidewall portion is secured between the securing member and the wheel.

18. The vehicle of claim 17, wherein one or more wheels do not have a wheel cover attached.

19. The vehicle of claim 17, wherein the circumferential wall portion is sized such that the circumferential wall portion engages the entire width of the rolling surface of the wheel when assembled.

20. The vehicle of claim 17, wherein the securing member comprises a nut configured to secure the wheel to the elongate member.

21. The vehicle of claim 17, wherein the protrusions comprise a generally cylindrical shape.

22. The vehicle of claim 17, wherein the protrusions have a length equal to at least a substantial portion of the width of the circumferential wall portion.

23. The vehicle of claim 17, further comprising an opening configured to allow a hook or peg to pass therethrough to facilitate the display of the vehicle.

24. The vehicle of claim 17, wherein the wheel cover is of a unitary construction.

25. The vehicle of claim 17, wherein the wheel cover does not cover the securing member such that the securing member remains accessible when the wheel cover is attached to the associated wheel.

26. A vehicle comprising:
  at least one wheel; and
  a wheel cover configured to be placed over the associated wheel, the wheel cover comprising:
    a circumferential wall portion, at least a portion of the circumferential wall portion sized such that at least a portion of the circumferential wall portion covers a portion of a rolling surface of the associated wheel when assembled;
    a sidewall portion extending from the circumferential wall portion, the sidewall portion sized such that the sidewall portion engages a side of the wheel when assembled, the sidewall portion comprising an opening sized and positioned to allow an elongate member to pass therethrough; and
    one or more protrusions positioned along the circumferential wall portion configured to inhibit rotation;
  wherein the wheel cover is configured to be secured to the wheel using a securing member on the elongate member;
  wherein at least a portion of the wheel cover is deformed onto the wheel to increase the fit.

* * * * *